United States Patent
Kouchi et al.

(10) Patent No.: US 8,320,009 B2
(45) Date of Patent: Nov. 27, 2012

(54) METHOD, APPARATUS, AND COMPUTER READABLE STORAGE MEDIUM FOR PREDICTING A DATA AMOUNT FOR IMAGE DATA PRIOR TO READING THE IMAGE DATA

(75) Inventors: Miki Kouchi, Kanagawa (JP); Rie Nakamura, Kanagawa (JP); Yoshinori Furuichi, Kanagawa (JP); Daisuke Noguchi, Kanagawa (JP); Tetsuo Asakawa, Tokyo (JP); Akihiro Kakoi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1295 days.

(21) Appl. No.: 11/839,734

(22) Filed: Aug. 16, 2007

(65) Prior Publication Data
US 2008/0050142 A1    Feb. 28, 2008

(30) Foreign Application Priority Data
Aug. 28, 2006  (JP) ................................. 2006-230789

(51) Int. Cl.
*G06K 15/00* (2006.01)
*H04N 1/00* (2006.01)
*G06K 9/36* (2006.01)

(52) U.S. Cl. .................. 358/1.16; 358/426.07; 358/505; 382/232

(58) Field of Classification Search .......................... None
See application file for complete search history.

(56) References Cited

U.S. PATENT DOCUMENTS

| | | | | |
|---|---|---|---|---|
| 6,462,833 | B1 * | 10/2002 | Claiborne | 358/1.16 |
| 7,463,775 | B1 * | 12/2008 | Sites | 382/232 |
| 2002/0066989 | A1 * | 6/2002 | Simpson | 270/52.01 |
| 2004/0145776 | A1 * | 7/2004 | Azami | 358/1.15 |
| 2006/0050974 | A1 * | 3/2006 | Tamura et al. | 382/232 |
| 2007/0002391 | A1 * | 1/2007 | Nagarajan et al. | 358/426.07 |

FOREIGN PATENT DOCUMENTS

| | | |
|---|---|---|
| CN | 1213116 A | 4/1999 |
| JP | 6-245042 | 9/1994 |
| JP | 8-116412 | 5/1996 |
| JP | 9-163069 | 6/1997 |
| JP | 9-168081 | 6/1997 |
| JP | 11-187191 | 7/1999 |
| JP | 3085000 | 7/2000 |
| JP | 2002-176360 | 6/2002 |
| JP | 2003-87538 | 3/2003 |
| JP | 2003-234881 | 8/2003 |

* cited by examiner

*Primary Examiner* — Vincent Rudolph
(74) *Attorney, Agent, or Firm* — Oblon, Spivak, McClelland, Maier & Neustadt, L.L.P.

(57) ABSTRACT

A disclosed image formation apparatus includes: an operation unit allowing input of reading conditions of image data; an input unit reading the image data in accordance with the reading conditions input via the operation unit; a first storage unit storing the image data read by the input unit; a second storage unit storing correspondence relation between the reading conditions and predicted data amount of the image data to be stored in the first storage unit; a data amount prediction unit predicting data amount of the image data to be read based on the reading conditions and the correspondence relation stored in the second storage unit; and a judgment unit judging whether to perform reading of the image data based on the predicted data amount and an available capacity of the first storage unit.

21 Claims, 12 Drawing Sheets

| RESOLUTION | PREDICTED DATA AMOUNT |
|---|---|
| 300dpi × 300dpi | X |

250a

| COLOR INFORMATION | PREDICTED DATA AMOUNT |
|---|---|
| MONOCHROME | X |

250b

| IMAGE AREA | PREDICTED DATA AMOUNT |
|---|---|
| A4 | X |

| COMPRESSION METHOD | COLOR INFORMATION | IMAGE AREA | RESOLUTION | PREDICTED DATA AMOUNT AVERAGE VALUE | PREDICTED DATA AMOUNT MAXIMUM VALUE |
|---|---|---|---|---|---|
| NON-COMPRESSION | MONOCHROME | A4 | 600dpi × 600dpi | X | X |
| COMPRESSION A | — | A4 | 600dpi × 600dpi | Y | 2Y |
| COMPRESSION A | — | A4 | 1200dpi × 1200dpi | 4.5Y | 10Y |
| COMPRESSION B | MONOCHROME | A4 | 600dpi × 600dpi | Z | 1.5Z |
| COMPRESSION B | FULL COLOR | A4 | 600dpi × 600dpi | 3Z | 5Z |

250e

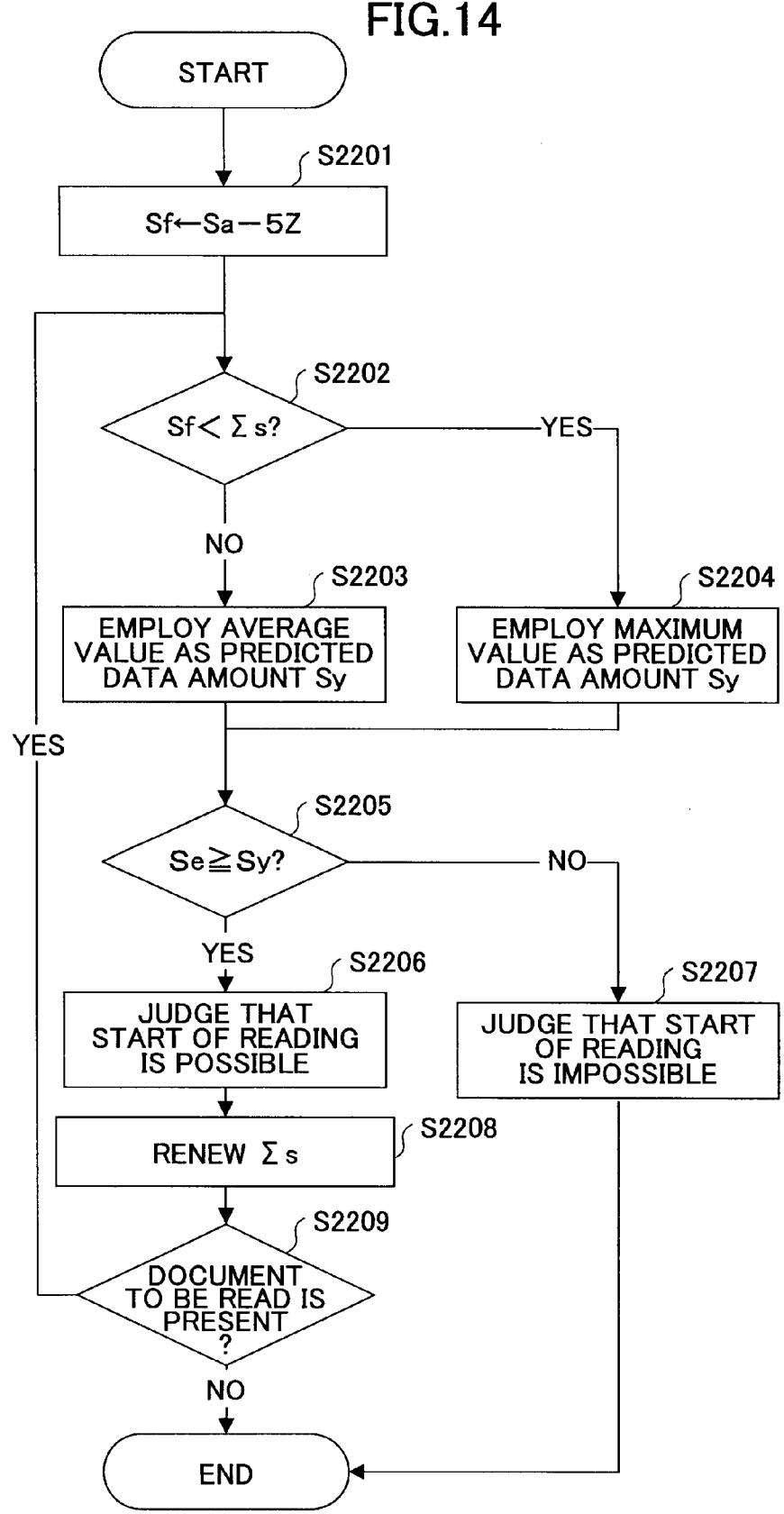

METHOD, APPARATUS, AND COMPUTER READABLE STORAGE MEDIUM FOR PREDICTING A DATA AMOUNT FOR IMAGE DATA PRIOR TO READING THE IMAGE DATA

BACKGROUND OF THE INVENTION

1. Field of the Invention

The present invention relates to an image formation apparatus.

2. Description of the Related Art

In an image formation apparatus such as a copying machine, in order to realize functions of processing plural documents (such as a sorting function, aggregation function, and duplex printing function), it is necessary to have storage capacity for accumulating image data on the plural documents. However, in an image formation apparatus without a mass storage device such as HDD, a number of sheets that can be accumulated is limited, so that an amount of data may exceed the storage capacity while the documents are being read.

In view of this, Patent Document 1 discloses a communication terminal device in which remaining amount of memory which has been detected is compared with first, second, and third thresholds. When the remaining amount reaches the first threshold, image information is output. When the remaining amount reaches the second threshold, image accumulation is suspended. When the remaining amount exceeds the second threshold again, the image accumulation is resumed. And when the remaining amount reaches the third threshold, the image accumulation is stopped.

Patent Document 1: Japanese Laid-Open Patent Application No. 06-233088

However, in the communication terminal device disclosed in Patent Document 1, the accumulation of image information is judged by merely comparing the remaining amount of memory with the thresholds set in advance. Thus, even when the read image information is actually smaller than the remaining amount of memory and can be accumulated in the memory, the accumulation of the image may be suspended.

SUMMARY OF THE INVENTION

It is a general object of the present invention to provide an improved and useful an image formation apparatus, information processing method, and information processing program in which the above-mentioned problems are eliminated.

A more specific object of the present invention is to provide an image formation apparatus, information processing method, and information processing program that can improve efficiency upon accumulating image data in a storage device.

According to one aspect of the present invention, there is provided an image formation apparatus comprising: an operation unit allowing input of reading conditions of image data; an input unit reading the image data in accordance with the reading conditions input via the operation unit; a first storage unit storing the image data read by the input unit; a second storage unit storing correspondence relation between the reading conditions and predicted data amount of the image data to be stored in the first storage unit; a data amount prediction unit predicting data amount of the image data to be read based on the reading conditions and the correspondence relation stored in the second storage unit; and a judgment unit judging whether to perform reading of the image data based on the predicted data amount and an available capacity of the first storage unit.

In such an image formation apparatus, it is possible to improve efficiency upon accumulating image data in a storage device.

Further, the present invention may be applied to an information processing method in the above-mentioned image formation apparatus and an information processing program for causing a computer to perform the above-mentioned information processing method.

According to the present invention, it is possible to provide an image formation apparatus, information processing method, and information processing program capable of improving efficiency upon accumulating image data in a storage device.

Other objects, features and advantage of the present invention will become more apparent from the following detailed description when read in conjunction with the accompanying drawings.

BRIEF DESCRIPTION OF THE DRAWINGS

FIG. 13 is a diagram showing an example of a predicted data amount table in which two sets of predicted data amounts are registered for each combination of plural conditions; and FIG. 14 is a flowchart illustrating a process of judging predicted data amount when two sets of predicted data amounts are registered for each combination of plural conditions.

DETAILED DESCRIPTION OF THE PREFERRED EMBODIMENTS

In the following, embodiments of the present invention will be described with reference to the accompanying drawings.

Figure 1:
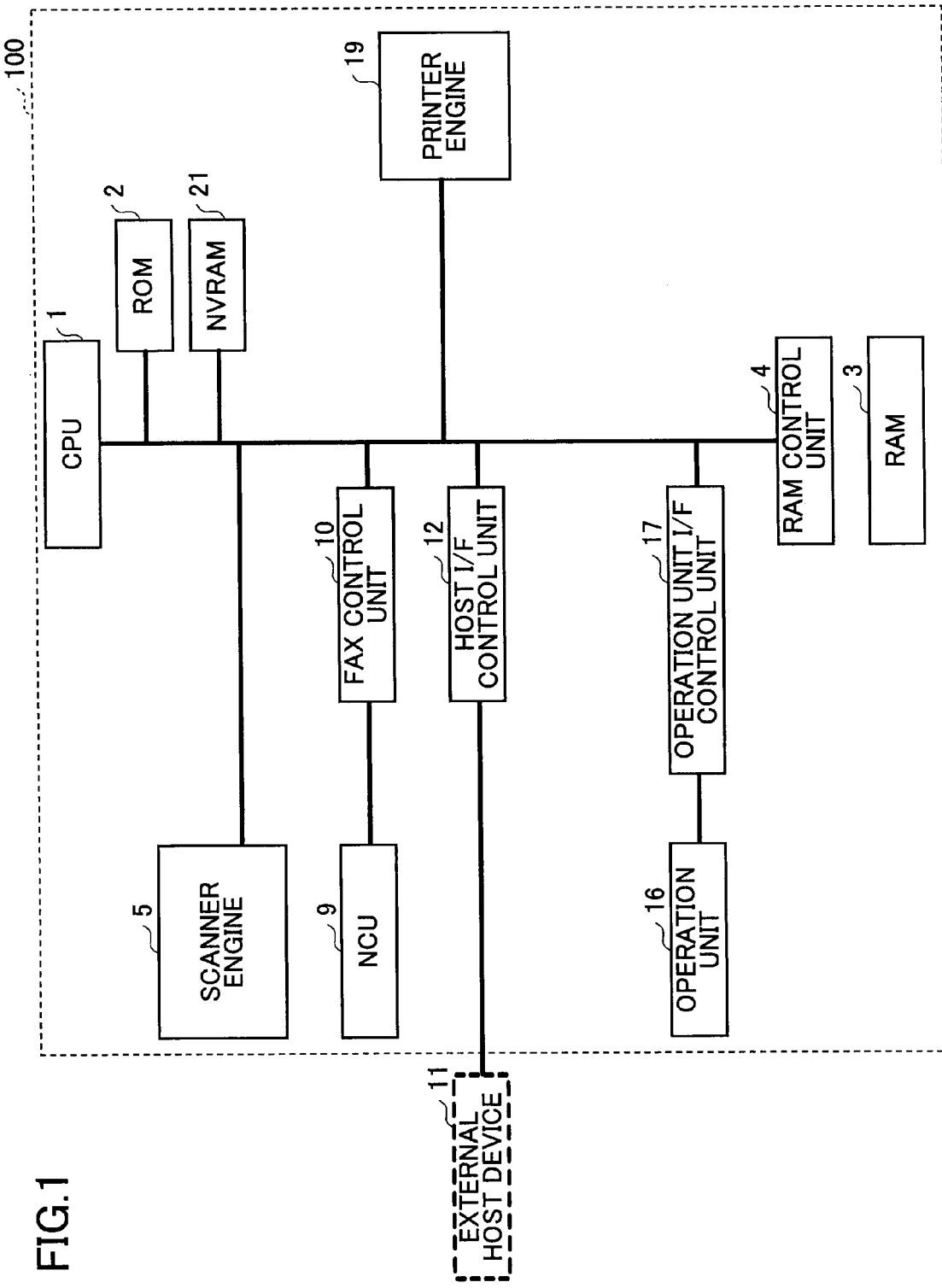
FIG. 1 is a diagram showing an example of a hardware configuration of an image formation apparatus according to an embodiment of the present invention.

FIG. 1 is a diagram showing an example of a hardware configuration of an image formation apparatus according to an embodiment of the present invention. In FIG. 1, an image formation apparatus 100 is a multi-function device realizing plural functions such as copying, printing, FAX transmission and reception, and the like in a single apparatus. The image formation apparatus 100 includes a CPU 1, ROM 2, RAM 3, RAM control unit 4, scanner engine 5, NCU (network control unit) 9, FAX control unit 10, host I/F control unit 12, operation unit 16, operation unit I/F control unit 17, printer engine 19, NVRAM 21, and the like.

The CPU 1 processes a program so as to instruct or control each block and realize functions of the image formation apparatus 100 according to the present embodiment. The ROM 2 stores the program processed by the CPU 1 and various types of data and the like used in the program. The RAM 3 is used via the RAM control unit 4 as a storage area for temporarily storing data and the like processed by the CPU 1 and the like. The scanner engine 5 is an image input unit reading a document image in the copying function and the scanner function. The NCU 9 is a device connecting to a public communication network and transmitting a dial signal so as to call a communication target. The FAX control unit 10 controls the FAX function. For example, the FAX control unit 10 decodes data received via the NCU 9 upon FAX reception and generates print data for causing the printer engine 19 to perform printing. A transmission image upon FAX transmission may be input from an external host device 11 other than the scanner engine 5.

The host I/F control unit 12 receives the print data from the external host device 11 as an image input unit in the printing function. An interface controlled by the host I/F control unit 12 is not limited to a specific element. Examples of connection include local connection such as IEEE 1284, USB, and network connection such as wired or wireless Ethernet (registered trademark). The operation unit 16 is an operation panel functioning as a man-machine interface to a user, including buttons for allowing operation of the image formation apparatus 100, indicators for displaying a status (indicators such as an LED, LCD, and speaker), and the like. The operation unit I/F control unit 17 inputs and outputs information to the operation unit 16. The printer engine 19 is a printout unit. An imaging method is not limited to a specific method and may be any one of a laser method, LED method, ink-jet method, and the like. The NVRAM 21 is a non-volatile memory and is used to store device-specific information (such as a counter value of a number of copies).

Figure 2:
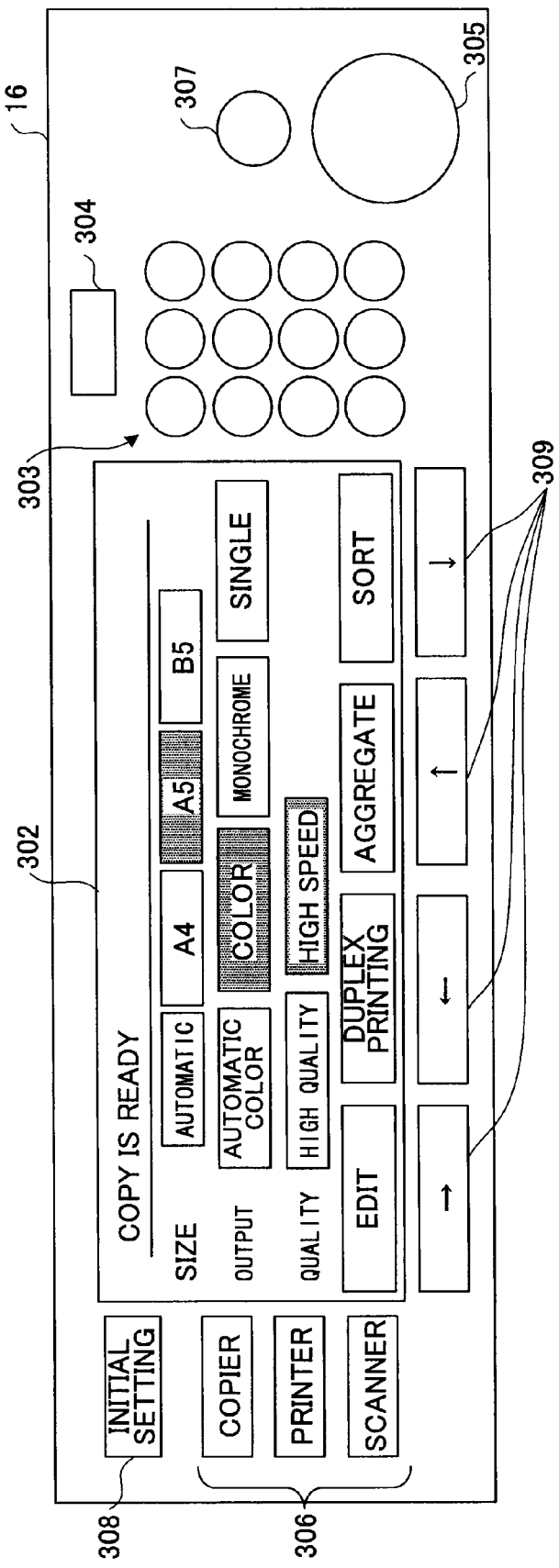
FIG. 2 is a diagram showing an example of a configuration of an operation unit.

FIG. 2 is a diagram showing an example of a configuration of the operation unit. In FIG. 2, the operation unit 16 includes a display unit 302, numeric keypad 303, reset key 304, start key 305, application switching key 306, clear/stop key 307, initial setting key 308, and the like.

The display unit 302 displays a character string, bitmap image, and the like. Further, the display unit 302 includes a touch panel and is used so as to operate setting such as reading conditions. The numeric keypad 303 is used for operation such as input of the number of copies. The reset key 304 is used upon resetting a copy mode. The start key 305 is used for operation instructing a start of copying or document reading. The application switching key 306 is used for operation switching among the copier function, printer function, scanner function, and the like. The clear/stop key 307 is used upon suspending copying and resetting the number of copies. The initial setting key 308 is used upon setting an initial value of various parameters used for the copier function, printer function, scanner function, and the like.

Figure 3:
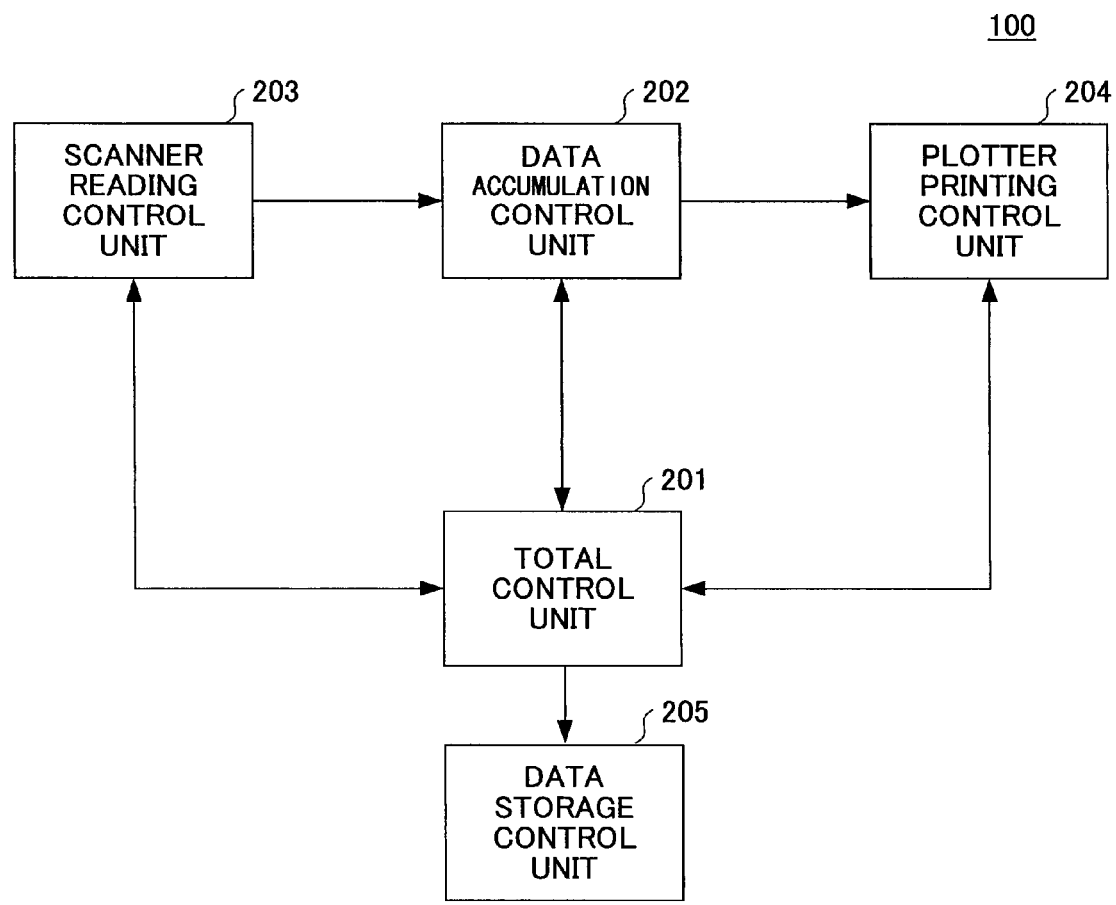
FIG. 3 is a diagram showing an example of a functional configuration of an image formation apparatus according to an embodiment of the present invention.

FIG. 3 is a diagram showing an example of a functional configuration of the image formation apparatus according to the embodiment of the present invention. In FIG. 3, the image formation apparatus 100 includes a total control unit 201, data accumulation control unit 202, scanner reading control unit 203, plotter printing control unit 204, data storage control unit 205, and the like. Each unit is realized when the program stored in the ROM 2 is loaded into the RAM 3 and is processed by the CPU 1.

The total control unit 201 controls an entire portion of process performed by the CPU 1. For example, the total control unit 201 controls the operation unit 16, host I/F control unit 12, FAX control unit 10, and the like. Control conditions are set via the operation unit 16.

The data accumulation control unit 202 manages an area for storing image data (hereafter referred to as an image storage area) input from an input unit such as the scanner engine 5, host I/F control unit 12, and the like, the image storage area being disposed on a portion of the RAM 3. The scanner reading control unit 203 controls the scanner engine 5. The plotter printing control unit 204 controls the printer engine 19. The data storage control unit 205 predicts, when image data is read using the scanner engine 5, a data amount required for accumulating the image data in the image storage area. The data amount predicted by the data storage control unit 205 is hereafter referred to as a "predicted data amount". The predicted data amount is judged based on reading conditions (including resolution, paper size, black and white/color, and the like), a correspondence table (hereafter referred to as a predicted data amount table) in which the reading conditions correspond to accumulated data amount, and the like. The predicted data amount table is stored in the NVRAM 21 or the ROM 2.

Figure 4:
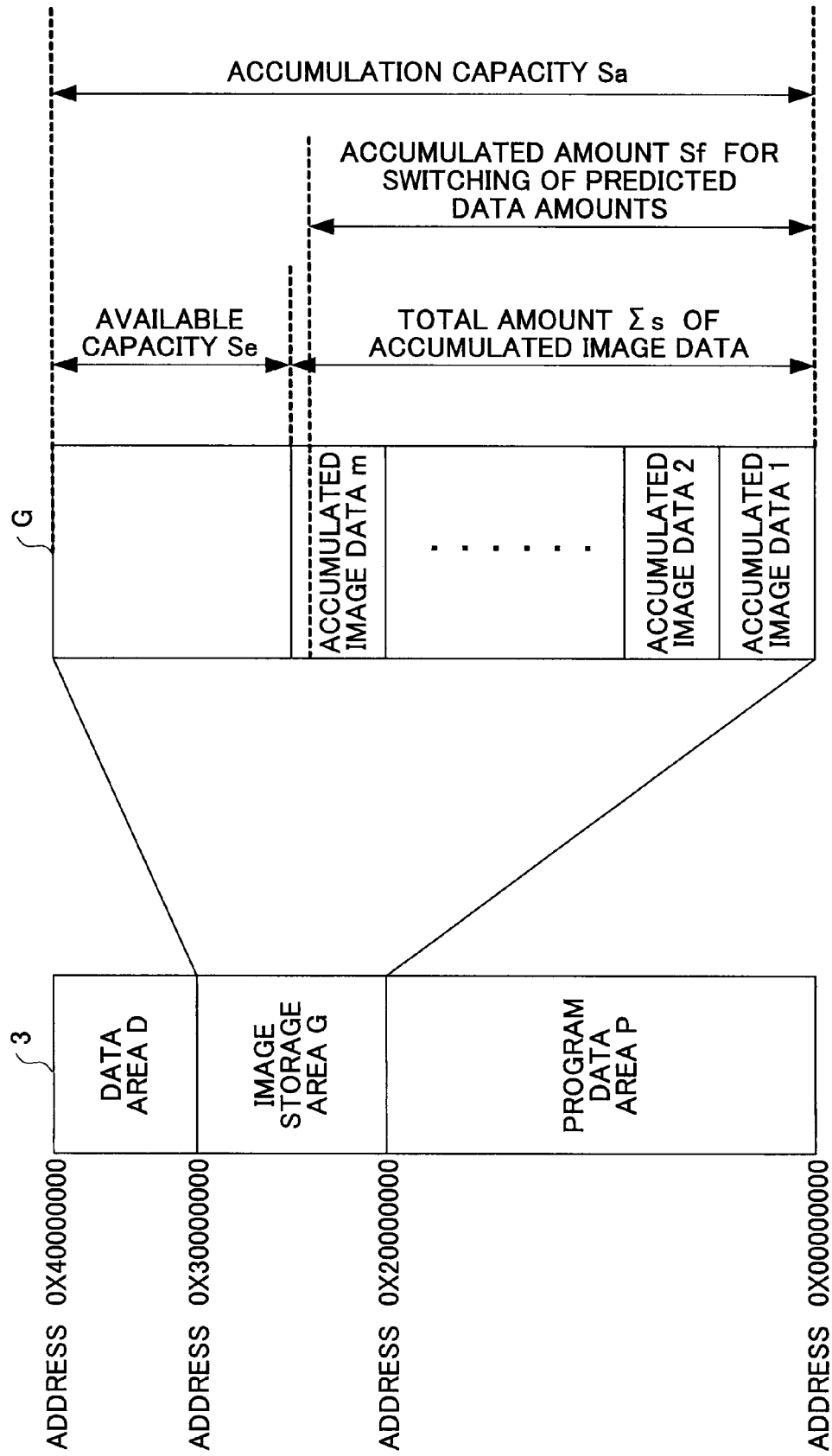
FIG. 4 is a diagram illustrating an image storage area.

In the following, the image storage area in the RAM 3 is described in detail. FIG. 4 is a diagram illustrating the image storage area. As shown in FIG. 4, the storage area of the RAM 3 is divided into a program data area P, image storage area G, and data area D.

In program data area P, various types of application programs are loaded. The data area D stores various types of conditions set in the image formation apparatus 100 and calculated values upon executing the program. The image storage area G stores image data input from the input unit such as the scanner engine 5, host I/F control unit 12, and the like as mentioned above. As shown in FIG. 4, the image storage area G is managed in accordance with parameters such as accumulation capacity Sa, accumulated amount Sf for switching predicted data amounts, available capacity Se, total amount Σs of accumulated image data, and the like.

The accumulation capacity Sa indicates a maximum capacity available for accumulating image data. The total amount Σs of accumulated image data indicates a total of data amount of all image data accumulated in the image storage area G. The accumulated amount Sf for switching predicted data amounts is a threshold for switching predicted data amounts of image data to be newly accumulated. The data accumulation control unit 202 detects the available capacity Se of the image storage area G based on the accumulation capacity Sa and the total amount Σs of accumulated image data. Specifically, the available capacity Se of the image storage area G is detected by subtracting the total amount Σs of accumulated image data from the accumulation capacity Sa.

In FIG. 4, each of accumulated image data 1, accumulated image data 2, . . . accumulated image data m corresponds to image data read in a single scanning (image data on a single page, for example). In this manner, image data on plural pages is accumulated at one time since image data on plural pages must be buffered in order to obtain an output result in the sorting function, aggregation function, duplex printing function, and the like.

The following describes a process of the image formation apparatus 100 in FIG. 3 for judging whether to accumulate image data in the image storage area G when the image data is newly input from the input unit.

Figure 5:
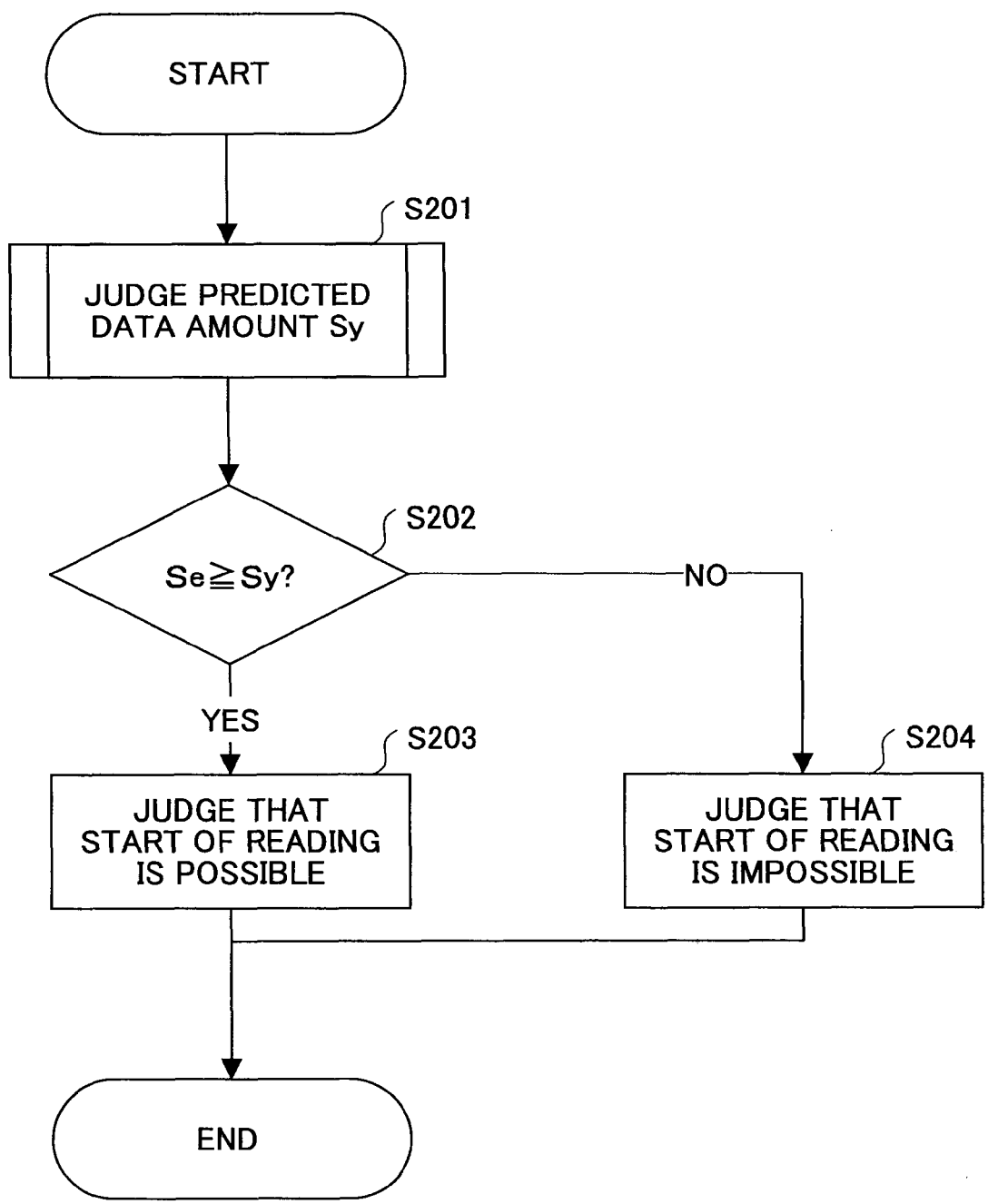
FIG. 5 is a flowchart illustrating an outline of a process of judging whether to accumulate image data.

FIG. 5 is a flowchart illustrating an outline of the process of judging whether to accumulate image data. For example, the process shown in FIG. 5 is performed each time before each page of a document is read after the document is set in the image formation apparatus 100, the reading conditions are input, the start key 305 is pressed, and reading of the document is stared.

First, the data storage control unit 205 judges predicted data amount Sy of image data to be newly read (hereafter referred to as "reading image") based on the reading conditions and the like (S201). Details of this process are described later.

Then, the total control unit 201 obtains the available capacity Se of the image storage area G from the data accumulation control unit 202 and judges whether to accumulate the reading image in the image storage area G (S202). In other words, if Se≧Sy, the total control unit 201 judges that reading is possible and starts image reading (S203). On the other hand, if Se<Sy, the total control unit 201 judges that reading is impossible and stops the image reading (S204).

In general, when the reading conditions (including resolution, paper size, black and white/color, and the like) are determined, it is possible to calculate data amount of a reading image. However, the predicted data amount Sy is used in the present embodiment because image data is compressed and accumulated so as to reduce consumption of the memory area as much as possible. The data amount after the compression of the image data is different depending on a compression method the image data, so that the data amount is not determined in accordance with the reading conditions. It is obvious that when the image data is compressed, it is possible to determine the data amount after the compression. However, in such a case, it is impossible to judge whether to accumulate unless image data is read. In view of this, the image formation apparatus 100 judges the predicted data amount Sy for the data amount of the reading image and judges whether to accumulate based on the predicted data amount Sy. In accordance with this, it is possible to judge whether to accumulate image data before the image data is read.

The predicted data amount Sy is intended to be prediction, so that the data amount is not necessarily accurate. Thus, when the predicted data amount Sy is smaller than an actual data amount, namely, when the data amount is undervalued, memory full may be generated. In view of this, at least two values may be held as predicted data amounts. For example, one predicted data amount is an average value of the data amount determined in accordance with contents of a document, the reading conditions, and the compression method. The other predicted data amount is a maximum data amount (maximum value) predicted in accordance with the contents of the document, reading conditions, and compression method. The average value and the maximum value may be obtained by collecting data using a test and the like or may be calculated theoretically. In the following, the average value is referred to as "predicted data amount Sy1" and the maximum value is referred to as "predicted data amount Sy2". When the two predicted data amounts are used, two predicted data amounts are registered in the predicted data amount table.

However, it is not efficient to judge whether to accumulate always based on the two predicted data amounts Sy. In view of this, the image formation apparatus 100 switches the two predicted data amounts in accordance with a certain condition.

Figure 6:
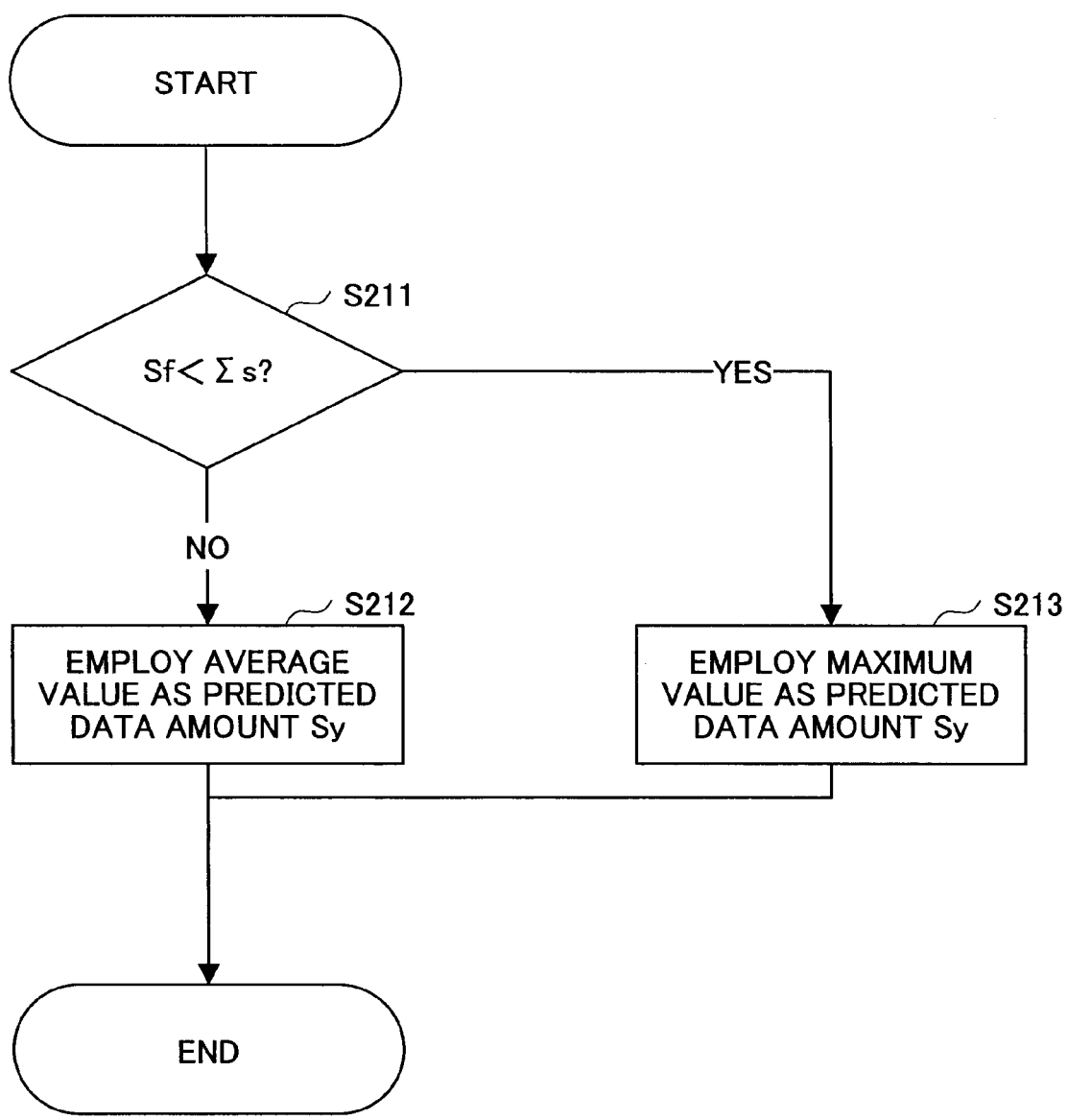
FIG. 6 is a flowchart illustrating a process for switching between two sets of predicted data amounts.

FIG. 6 is a flowchart illustrating a process for switching between two sets of predicted data amounts.

The data storage control unit 205 compares the accumulated amount Sf for switching predicted data amounts with the total amount Σs of accumulated image data obtained from the data accumulation control unit 202 (S211). In addition, the accumulated amount Sf for switching predicted data amounts may be registered in an area of the ROM 2 or the NVRAM 21 to which the data storage control unit 205 is capable of referring or may be automatically calculated upon performing copying and the like.

If the total amount Σs of accumulated image data is not more than the accumulated amount Sf for switching predicted data amounts (No, in S211), the data storage control unit 205 employs the predicted data amount Sy1 (average value) as the predicted data amount Sy (S212). On the other hand, if the total amount Σs of accumulated image data exceeds the accumulated amount Sf for switching predicted data amounts (Yes, in S211), the data storage control unit 205 employs the predicted data amount Sy2 (maximum value) as the predicted data amount Sy (S213).

A value of the accumulated amount Sf for switching predicted data amounts may be determined based on the maximum value of the data amount after the compression determined in accordance with the specification of the image formation apparatus 100, for example. In other words, the accumulated amount Sf for switching predicted data amounts is obtained by subtracting the maximum value from the accumulation capacity Sa. In addition, the maximum value of the data amount after the compression determined in accordance with the specification of the image formation apparatus 100 refers to image data amount after the compression with least efficient compression when a maximum size document that the image formation apparatus 100 is capable of reading is read in a maximum resolution. Further, when the image formation apparatus 100 is capable of reading a color image, color reading is also considered.

By determining the accumulated amount Sf for switching predicted data amounts in this manner and switching the predicted data amounts Sy as shown in FIG. 6, it is possible to prevent the possibility of memory full. On the other hand, until the total amount Σs of accumulated image data achieves the accumulated amount Sf for switching predicted data amounts, whether to accumulate is judged based on the predicted data amount Sy1, so that it is possible to accumulate larger image data in the image storage area G in comparison with a case where the predicted data amount Sy2 is always used.

Figure 7:
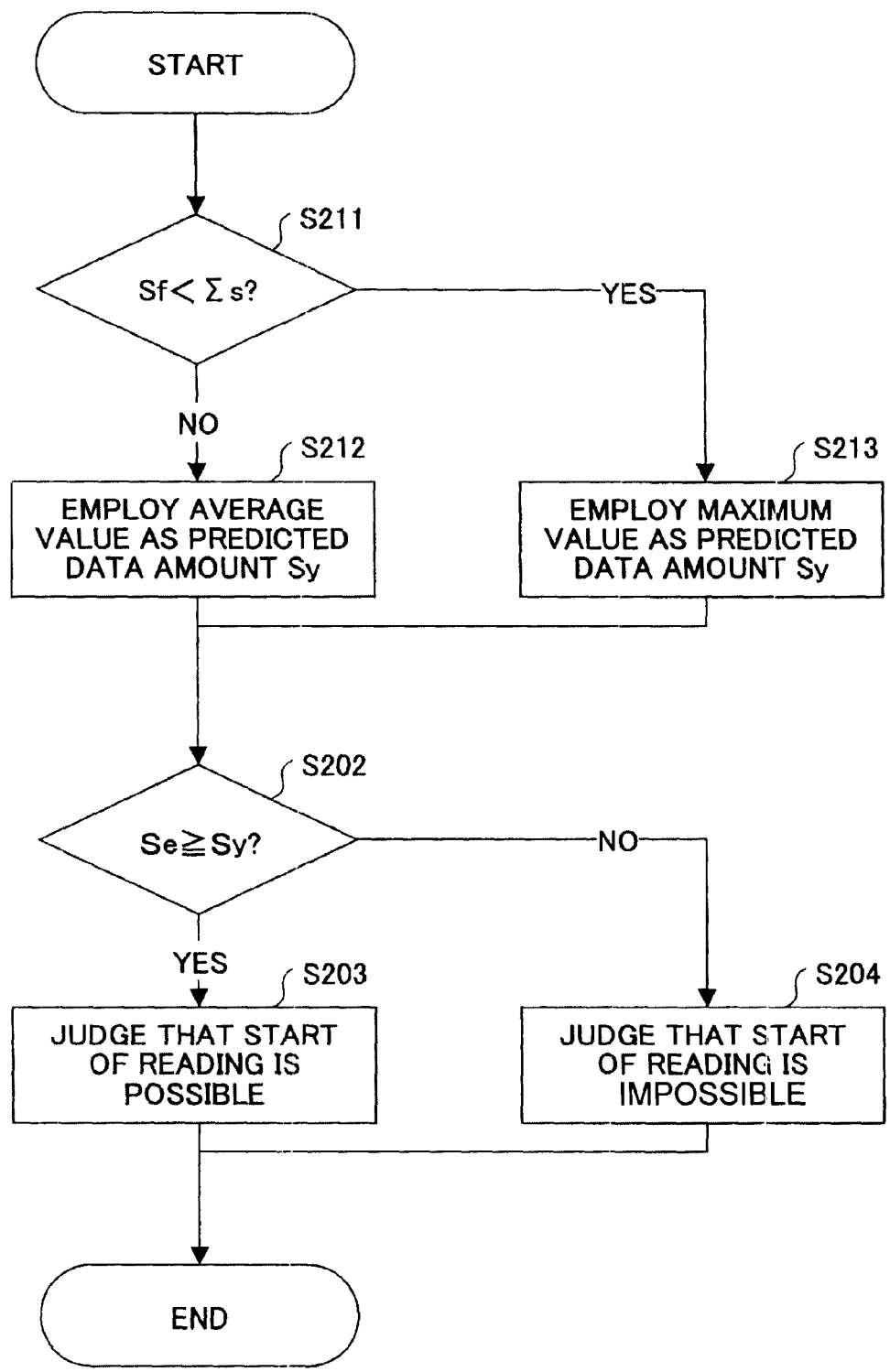
FIG. 7 is a flowchart illustrating an outline of a process of judging whether to accumulate image data when switching between predicted data amounts is considered.

In addition, the process shown in FIG. 6 is performed at a time corresponding to S201 shown in FIG. 5. Thus, when the flowchart of FIG. 5 is modified taking into consideration the process of FIG. 6, a process shown in FIG. 7 is obtained. FIG. 7 is a flowchart illustrating an outline of a process of judging whether to accumulate image data when switching between predicted data amounts is considered. In FIG. 7, the same step numbers are assigned to the same steps as in FIGS. 5 and 6. Thus, description of each step is omitted.

In the following, obtaining of the predicted data amount Sy is described. First, an example where the predicted data amount Sy is judged based on resolution is described. When the predicted data amount Sy is judged based on the resolution, the predicted data amount table is constructed as shown in FIG. 8, for example.

Figure 8:
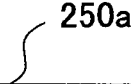
FIG. 8 is a diagram showing an example of a configuration of a predicted data amount table based on resolution.

FIG. 8 is a diagram showing an example of a configuration of the predicted data amount table based on the resolution. In a predicted data amount table 250a shown in FIG. 8, X (K Byte) is registered as predicted data amount when the resolution is 300 dpi×300 dpi.

After the reading conditions set in the operation unit 16 are determined using the start key 305, when the resolution in the determined reading conditions is 600 dpi×600 dpi, for example, data amount of a reading image is predicted to be two times a case where the resolution is 300 dpi×300 dpi in a main scanning direction and a sub-scanning direction. Thus, the data storage control unit 205 judges the predicted data amount Sy to be 4X based on the predicted data amount table 250a. On the other hand, when the resolution in the determined reading conditions is 300 dpi×300 dpi, the data storage control unit 205 judges the predicted data amount Sy to be X. In other words, when there is no item corresponding to the set resolution in the predicted data amount table 250a, the data storage control unit 205 judges the predicted data amount Sy based on the registered information. However, if the ROM 2 or the NVRAM 21 is sufficiently available, predicted data amount may be registered for each of all the resolutions which can be set in the image formation apparatus 100.

The prediction based on the resolution as mentioned above is effective and appropriate prediction is possible when the image formation apparatus 100 is a monochrome device and an image area (image size) that can be specified upon reading is small. In the predicted data amount table 250a of FIG. 8, only a single set of predicted data amount is registered. However, the two predicted data amounts of the average value and the maximum value may be registered as mentioned above and the values of the predicted data amounts Sy may be switched in the process described in FIG. 6.

Next, an example where the predicted data amount Sy is judged based on color information is described. When the predicted data amount Sy is judged based on the color information, the predicted data amount table is constructed as shown in FIG. 9, for example.

Figure 9:
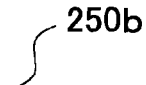
FIG. 9 is a diagram showing an example of a configuration of a predicted data amount table based on color information.

FIG. 9 is a diagram showing an example of a configuration of the predicted data amount table based on the color information. In a predicted data amount table 250b shown in FIG. 9, X (K Byte) is registered as predicted data amount when the color information is monochrome.

After the reading conditions set in the operation unit 16 are determined using the start key 305, when the color information in the determined reading conditions is full color, data on four colors of C (cyan), M (magenta), Y (yellow), and K (black) is required, so that the data amount of a reading image is predicted to be four times the case of a monochrome image. Thus, the data storage control unit 205 judges the predicted data amount Sy to be 4X based on the predicted data amount table 250b. On the other hand, when the color information in the determined reading conditions is monochrome, the data storage control unit 205 judges the predicted data amount Sy to be X. In other words, when there is no item corresponding to the set color information in the predicted data amount table 250b, the data storage control unit 205 judges the predicted data amount Sy based on the registered information. However, if the ROM 2 or the NVRAM 21 is sufficiently available, predicted data amount may be registered for each of all the color information which can be set in the image formation apparatus 100.

The prediction based on the color information as mentioned above is effective and appropriate prediction is possible when the image formation apparatus 100 is a color device and the image area that can be specified upon reading is small. In the predicted data amount table 250b of FIG. 9, only a single set of predicted data amount is registered. However, the two predicted data amounts of the average value and the maximum value may be registered as mentioned above and the values of the predicted data amounts Sy may be switched in the process described in FIG. 6.

Next, an example where the predicted data amount Sy is judged based on the image area upon storing in a storage unit is described. When the predicted data amount Sy is judged based on the image area, the predicted data amount table is constructed as shown in FIG. 10, for example.

Figure 10:
FIG. 10 is a diagram showing an example of a configuration of a predicted data amount table based on an image area.

FIG. 10 is a diagram showing an example of a configuration of the predicted data amount table based on the image area. In a predicted data amount table 250c shown in FIG. 10, X (K Byte) is registered as predicted data amount when the image area is A4.

After the reading conditions set in the operation unit 16 are determined using the start key 305, when the image area in the determined reading conditions is A5, the data storage control unit 205 judges the predicted data amount Sy to be ½X based on the predicted data amount table 250c since the image area of A5 is a half (½) of that of A4. On the other hand, when the image area in the determined reading conditions is A4, the data storage control unit 205 judges the predicted data amount Sy to be X. In other words, when there is no item corresponding to the set image area in the predicted data amount table 250c, the data storage control unit 205 judges the predicted data amount Sy based on the registered information. However, if the ROM 2 or the NVRAM 21 is sufficiently available, predicted data amount may be registered for each of all the image areas which can be set in the image formation apparatus 100.

The prediction based on the image area as mentioned above is effective when the image formation apparatus 100 is a device with a wide range of supported sizes such as an A3-capable device, for example. In the predicted data amount table 250c of FIG. 10, only a single set of predicted data amount is registered. However, the two predicted data amounts of the average value and the maximum value may be registered as mentioned above and the values of the predicted data amounts Sy may be switched in the process described in FIG. 6.

Next, an example where the predicted data amount Sy is judged based on the compression method is described. When the predicted data amount Sy is judged based on the compression method, the predicted data amount table is constructed as shown in FIG. 11, for example.

Figure 11:
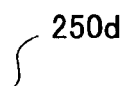
FIG. 11 is a diagram showing an example of a configuration of a predicted data amount table based on a compression method.

FIG. 11 is a diagram showing an example of a configuration of the predicted data amount table based on the compression method. In a predicted data amount table 250d shown in FIG. 11, X (K Byte) is registered as predicted data amount when the compression method is performed in a non-compression mode. Also, Y (K Byte) is registered as predicted data amount when the compression method is performed in a well-known binary compression mode. Y indicates data amount after the compression.

Figure 12:
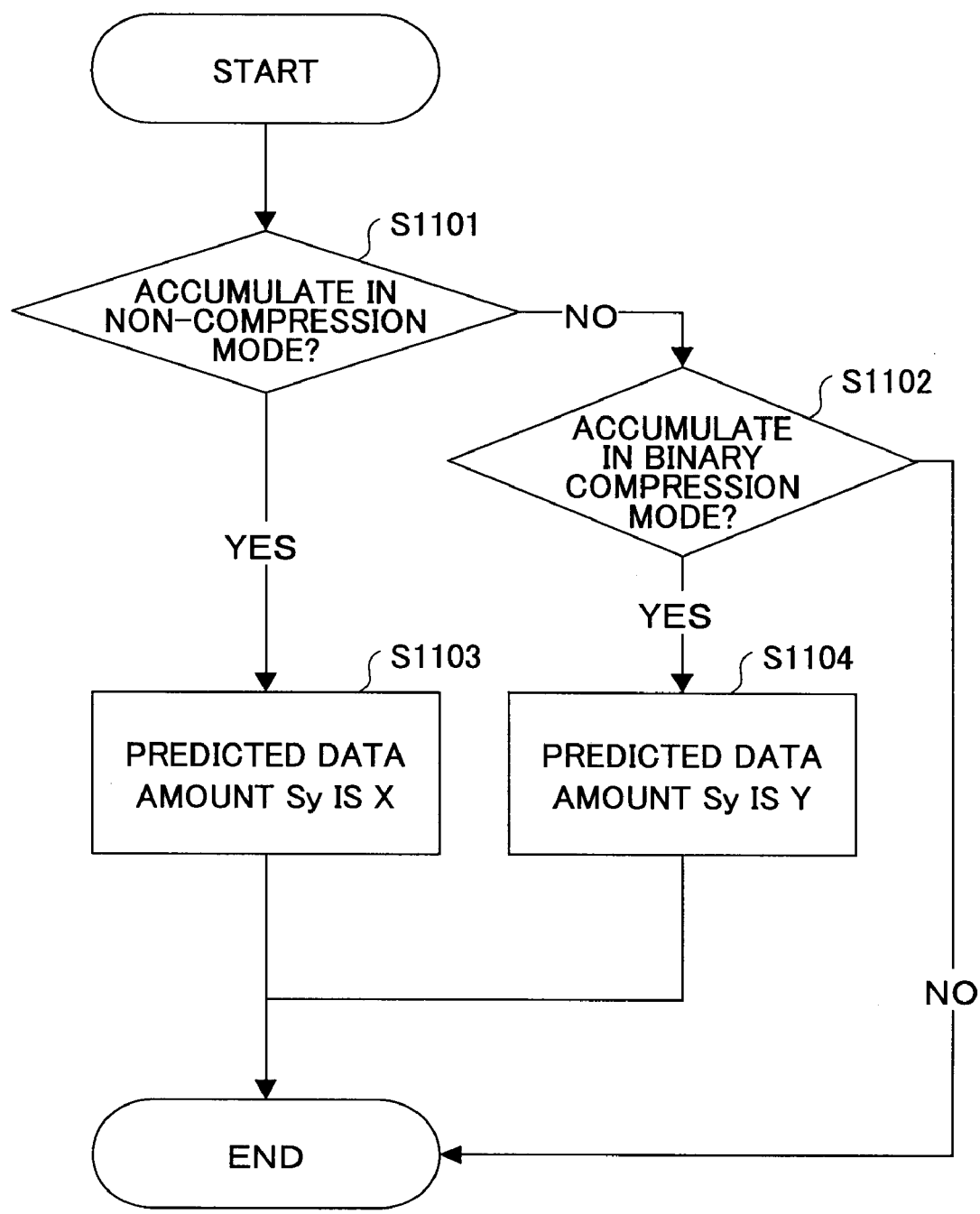
FIG. 12 is a flowchart illustrating a process of judging predicted data amount based on a compression method.

FIG. 12 is a flowchart illustrating a process of judging predicted data amount based on the compression method. The flowchart of FIG. 12 corresponds to the predicted data amount table 250d shown in FIG. 11.

After the reading conditions set in the operation unit 16 are determined using the start key 305, when the determined reading conditions are specified such that read image data is stored in the non-compression mode (YES, in S1101), the data storage control unit 205 judges the predicted data amount Sy to be X based on the predicted data amount table 250d (S1103).

On the other hand, when the reading conditions are specified such that the read image data is stored in the binary compression mode (YES, in S1102), the data storage control unit 205 judges the predicted data amount Sy to be Y based on the predicted data amount table 250d (S1104).

The prediction based on the compression methods as mentioned above is effective when various types of compression methods such as non-compression, binary compression, JPEG compression, and the like are prepared upon accumulating data and data amount after the compression is greatly changed depending on the compression methods. Examples of such a change include a case where the image formation apparatus 100 provided with an electronic sorting function and the like performs compression and accumulation when a large amount of data needs to be accumulated for the electronic sorting while normally performing accumulation in the non-compression mode. In the predicted data amount table 250$d$ of FIG. 11, only a single set of predicted data amount is registered. However, the two predicted data amounts of the average value and the maximum value may be registered as mentioned above and the values of the predicted data amounts Sy may be switched in the process described in FIG. 6.

In the following, a specific example in which the examples mentioned above are combined is described. FIG. 13 is a diagram showing an example of a predicted data amount table in which two sets of predicted data amounts are registered for each combination of plural conditions.

In a predicted data amount table 250$e$ shown in FIG. 13, the predicted data amount Sy1 of the average value and the predicted data amount Sy2 of the maximum value are registered for each combination of the compression method, color information, image area, and resolution.

FIG. 14 is a flowchart illustrating a process of judging predicted data amount when two sets of predicted data amounts are registered for each combination of plural conditions. The process of FIG. 14 corresponds to the predicted data amount table 250$e$ of FIG. 13.

After the reading conditions set in the operation unit 16 are determined using the start key 305, it is assumed that the compression method is compression B, the color information is full color, the image area is A4, and the resolution is 600 dpi×600 dpi in the determined reading conditions. The reading conditions (hereafter referred to as "reading condition A") correspond to the bottom item in the predicted data amount table 250$e$. In the following, a relevant item is referred to a "corresponding item".

First, the data storage control unit 205 calculates the accumulated amount Sf for switching predicted data amounts (S2201). In the corresponding item of the predicted data amount table 250$e$, the maximum value of the predicted data amount is 5Z. In other words, in the reading condition A, image data not less than 5Z is not accumulated. Thus, the data storage control unit 205 sets "accumulation capacity Sa−5Z" as the accumulated amount Sf for switching predicted data amounts.

In this case, in order to prevent generation of memory full, a value capable of holding 5Z (predicted data amount Sy2) as the available capacity Se in the image storage area G is determined as the accumulated amount Sf for switching predicted data amounts. However, the accumulated amount Sf for switching predicted data amounts may be determined in accordance with other standard. For example, upon performing copying operation, when images may be accumulated by reading ahead documents to such an extent that a printing speed is not affected therefrom, if a number of documents to be read ahead is 2, 2×5Z (total amount Σs of accumulated image data when reading is performed in the maximum size upon compression) may be determined as the accumulated amount Sf for switching predicted data amounts.

Then, the data storage control unit 205 compares the calculated accumulated amount Sf for switching predicted data amounts with the total amount Σs of accumulated image data (S2202). If the total amount Σs of accumulated image data is not more than the accumulated amount Sf for switching predicted data amounts (NO, in S2202), the data storage control unit 205 employs 3Z, which is the average value of the predicted data amount, as the predicted data amount Sy (S2203). Subsequently, the total control unit 201 obtains the available capacity Se of the image storage area G from the data accumulation control unit 202 and judges whether to accumulate the reading image in the image storage area G (S2205). In other words, if the available capacity Se is not less than 3Z (YES, in S2205), the reading is judged to be possible and image reading is started (S2206). After the reading operation is ended, an actual data amount of the reading image is determined and the data accumulation control unit 202 renews the total amount Σs of accumulated image data using the determined data amount (S2208).

In addition, when the next document to be read is present (YES, in S2209), the process from the step S2202 is repeated. As a result of the repetition of the steps S2202 to S2209, when the total amount Σs of accumulated image data becomes larger than the accumulated amount Sf for switching predicted data amounts (YES, in 2202), the data storage control unit 205 employs 5Z, which is the maximum value of the predicted data amount, as the predicted data amount Sy (S2204).

If the available capacity Se is smaller than the predicted data amount Sy (NO, in S2205), the total control unit 201 judges that reading is impossible and stops the image reading (S2207). However, instead of immediately stopping the reading operation, it is possible to wait for the total amount Σs of accumulated image data to be reduced by being deleted from the image storage area G in accordance with output (printing, for example) of the accumulated data and to perform the process from S2202 again.

As mentioned above, in the image formation apparatus 100 according to the present invention, whether to perform accumulation is judged not only from the available capacity of the memory but also from the reading conditions. Thus, it is possible to efficiently perform accumulation of image data in the memory and to prevent generation of memory full. Further, even when the image data is compressed and accumulated, data amount after the compression is predicted so as to perform accumulation, so that it is possible to judge whether to perform accumulation before reading the image data.

The present embodiment is described mainly on the basis of the case where the image data is compressed and accumulated. However, even when the image data is not compressed, it is possible to apply the technique of judging whether to perform accumulation from the reading conditions. In this case, the data amount of the reading image is readily calculated from the reading conditions, so that whether to perform accumulation may be judged based on the calculated data amount instead of the predicted data amount Sy.

The present invention is not limited to the specifically disclosed embodiment, and variations and modifications may be made without departing from the scope of the present invention.

The present application is based on Japanese priority application No. 2006-230789 filed Aug. 28, 2006, the entire contents of which are hereby incorporated herein by reference.

What is claimed is:

1. An image formation apparatus, comprising:
   an operation unit allowing input of reading conditions of image data;
   a first storage unit storing accumulated image data previously read by an input unit;
   a second storage unit storing a correspondence relation between the reading conditions and at least one registered prediction amount for the image data to be stored in the first storage unit, the at least one registered prediction amount including a first registered predicted data amount specifying an average prediction value for a data amount of the image data and a second registered data amount specifying a maximum prediction value for the data amount;

a data amount prediction unit predicting a data amount of the image data to be read based on the reading conditions and the correspondence relation stored in the second storage unit by selecting one of the first registered predicted data amount and the second registered data amount;

a judgment unit judging whether to perform reading of the image data based on the predicted data amount and an available capacity of the first storage unit; and the input unit reading the image data in accordance with the reading conditions input via the operation unit, based on a judgment result of the judging unit.

2. The image formation apparatus according to claim 1, wherein the reading conditions include a specification of a resolution.

3. The image formation apparatus according to claim 1, wherein the reading conditions include a specification of color information.

4. The image formation apparatus according to claim 1, wherein the reading conditions include a specification of an image area of the image data to be read.

5. The image formation apparatus according to claim 1, wherein the first storage unit stores the image data after reading and compression, and the correspondence relation specifies a relation between the reading conditions and at least one registered prediction amount for the image data after compression.

6. The image formation apparatus according to claim 5, wherein the reading conditions include a compression method to be used when storing the image data to be read.

7. The image formation apparatus according to claim 1, wherein the second storage unit stores, for each of the reading conditions, at least two registered prediction amounts for the data amount of the image, the at least two registered prediction amounts including the first registered predicted data amount and the second registered data amount, and the data amount prediction unit selects one of the first registered predicted data amount and the second registered data amount, in accordance with the available capacity of the first storage unit.

8. The image formation apparatus according to claim 7, wherein the data amount prediction unit selects, based on a comparison of the available capacity of the first storage unit and a predetermined threshold, one of the at least two registered prediction amounts as the predicted data amount of the image data to be read.

9. The image formation apparatus according to claim 7, wherein the at least two registered prediction amounts are determined based on at least one of: contents of a test document; the reading conditions; and a compression method to be used when storing the image data.

10. The image formation apparatus according to claim 1, wherein the image data to be read includes a plurality of pages and the judgment unit makes a judgment, for each individual page of the plurality of pages, as to whether to perform reading of the individual page.

11. The image formation apparatus according to claim 1, wherein the data amount prediction unit refers to a predetermined accumulation amount, that specifies a threshold amount of the accumulated image data previously read by the input unit, to determine which of the first registered predicted data amount and the second registered data amount to select.

12. An information processing method, performed by an image formation apparatus, the information processing method comprising:

allowing input of reading conditions of image data;

storing accumulated image data previously read in a first storage unit;

predicting, based on the input reading conditions and a correspondence relation between the reading conditions and at least one registered prediction amount the image data to be stored, the correspondence relation being stored in a second storage unit, the at least one registered prediction amount including a first registered predicted data amount specifying an average prediction value for a data amount of the image data and a second registered data amount specifying a maximum prediction value for the data amount, a predicted data amount of the image data to be read by selecting one of the first registered predicted data amount and the second registered data amount;

judging, by at least one hardware processor of the image formation apparatus, whether to perform reading of the image data based on the predicted data amount and an available capacity of the first storage unit, and reading the image data, in accordance with the input reading conditions, based on the judging.

13. The information processing method according to claim 12, wherein the reading conditions include a specification of a resolution.

14. The information processing method according to claim 12, wherein the reading conditions include a specification of color information.

15. The information processing method according to claim 12, wherein the reading conditions include a specification of an image area of the image data to be read.

16. The information processing method according to claim 12, wherein the image data is stored after reading and compression, and the correspondence relation specifies a relation between the reading conditions and at least one registered prediction amount for the image data after compression.

17. The information processing method according to claim 16, wherein the reading conditions include a compression method to be used when storing the image data to be read.

18. The information processing method according to claim 12, wherein the second storage unit stores, for each of the reading conditions, at least two registered prediction amounts for the data amount of the image data to be stored, and in the predicting, in accordance with the available capacity of the first storage unit, selecting one of the at least two registered prediction amounts as the predicted of the image data to be read.

19. The information processing method according to claim 18, wherein in the predicting, based on comparison of the available capacity of the first storage unit and a predetermined threshold, one of the at least two registered prediction amounts is selected as the predicted data amount of the image data to be read.

20. A non-transitory computer-readable storage medium having computer readable program codes embodied in the computer readable storage medium which, when executed by a computer, cause the computer to perform an information processing method comprising:

allowing input of reading conditions of image data;

storing accumulated image data previously read in a first storage unit;

predicting, based on the input reading conditions and a correspondence relation between the reading conditions and at least one registered prediction amount the image data to be stored, the correspondence relation being stored in a second storage unit, the at least one registered prediction amount including a first registered predicted data amount specifying an average prediction value for a data amount of the image data and a second registered data amount specifying a maximum prediction value for the data amount, a predicted data amount of the image data to be read by selecting one of the first registered predicted data amount and the second registered data amount;

judging whether to perform reading of the image data based on the predicted data amount and an available capacity of the first storage unit, and reading the image data, in accordance with the input reading conditions, based on the judging.

21. An information processing method, performed by an image formation apparatus, comprising:

receiving input of reading conditions of image data to be read;

prior to reading the image data, predicting a data amount of the image data to be read by selecting a pre-registered value from a plurality of pre-registered values, the selection being based on a threshold switching condition related to an available capacity of a storage in which the image data is to be stored and based on a relationship between the reading conditions and the plurality of pre-registered values, the plurality of pre-registered values including a first pre-registered predicted data amount specifying an average prediction value for a data amount of the image data and a second pre-registered data amount specifying a maximum prediction value for the data amount; and reading the image data in accordance with the reading conditions, by at least one hardware processor of the image formation apparatus, when a determination to perform reading of the image data is made, the determination being based on the predicted data amount of the image data to be read and the available capacity of the storage.

* * * * *